United States Patent [19]

Meyers

[11] Patent Number: 5,336,351
[45] Date of Patent: Aug. 9, 1994

[54] METHOD FOR CONNECTING A PIPE CONNECTOR TO A HARD PLASTIC PIPE

[75] Inventor: Theodore W. Meyers, Inverness, Ill.

[73] Assignee: Tuf-Tite, Inc., Wauconda, Ill.

[21] Appl. No.: 913,140

[22] Filed: Jul. 14, 1992

[51] Int. Cl.⁵ .............................................. B29C 65/00
[52] U.S. Cl. ..................... 156/158; 156/294; 156/308.6; 156/309.3; 156/309.6; 264/248; 264/249; 264/274; 285/21; 285/423; 285/903
[58] Field of Search ............... 285/21, 915, 423, 177, 285/903, 292, 390, 223, 235; 156/91, 158, 293, 294, 308.6, 309.3, 309.6; 264/248, 249, 274, 267, 299, 265, 279.1

[56] References Cited

U.S. PATENT DOCUMENTS

| | | | |
|---|---|---|---|
| 3,471,179 | 10/1969 | Sixt | 285/237 |
| 3,649,055 | 3/1972 | Nilsen | 285/21 |
| 3,857,588 | 12/1974 | Curtin | 285/235 |
| 4,019,760 | 4/1977 | Streit | 285/3 |
| 4,037,626 | 7/1977 | Roberts, Jr. | 285/903 |
| 4,124,236 | 11/1978 | Guidry | 285/903 |
| 4,137,117 | 1/1979 | Jones | 156/294 |
| 4,141,576 | 9/1979 | Kupke et al. | 285/903 |
| 4,591,193 | 5/1986 | Oltmanns et al. | 285/903 |
| 4,606,558 | 8/1986 | Davidson | 156/60 |
| 4,810,008 | 3/1989 | Brodie | 285/235 |
| 4,946,206 | 8/1990 | Roe et al. | 285/903 |
| 5,072,972 | 12/1991 | Justice | 285/903 |
| 5,180,195 | 1/1993 | Petroff et al. | 285/231 |
| 5,180,196 | 1/1993 | Skinner | 285/253 |
| 5,180,197 | 1/1993 | Thompson, Jr. | 285/351 |

FOREIGN PATENT DOCUMENTS

| | | | |
|---|---|---|---|
| 1115103 | 4/1956 | France | 156/294 |
| 1264634 | 12/1961 | France | 264/249 |
| 47973 | 4/1976 | Japan | 285/21 |
| 2-8587 | 1/1990 | Japan | 285/903 |
| 610080 | 3/1979 | Switzerland | 285/903 |
| 1288648 | 9/1972 | United Kingdom | 156/294 |

Primary Examiner—Michael W. Ball
Assistant Examiner—Steven D. Maki
Attorney, Agent, or Firm—Tilton, Fallon, Lungmus & Chestnut

[57] ABSTRACT

A flexible pipe connector is disclosed for connecting to a hard plastic pipe. The flexible pipe connector, preferably made of polyethylene, has a tubing member which defines a cylindrical wall with inner and outer surfaces, the cylindrical wall having a male end which has a plurality of undercuts formed on the outer surface. The male end with the undercuts is inserted into the female end of a hard plastic pipe with a solvent weld glue applied at the inner surface thereof. The solvent weld glue liquifies the inner surface of the pipe's female end to form a liquified layer of hard plastic which is received in the male end's undercuts and then hardens into a reconfigured solid layer. In this manner, the flexible pipe connector, which is inert and normally cannot be attached with glue to a hard plastic pipe, can be sealably secured to a hard plastic pipe as the liquified layer solidifies within the undercuts to prevent separation of the pipe connector and the hard plastic pipe and to provide a seal therebetween.

7 Claims, 2 Drawing Sheets

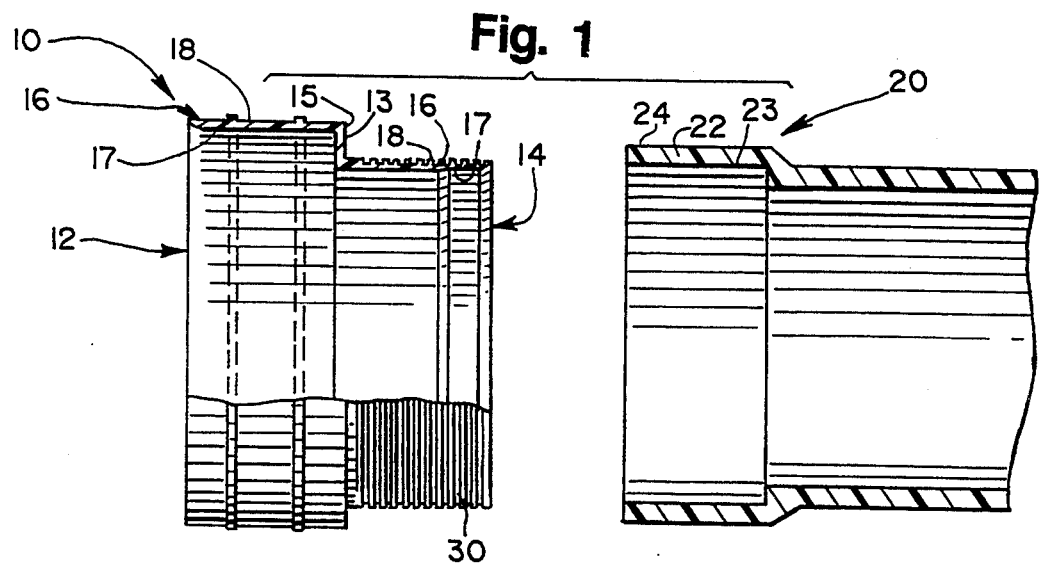
Fig. 1
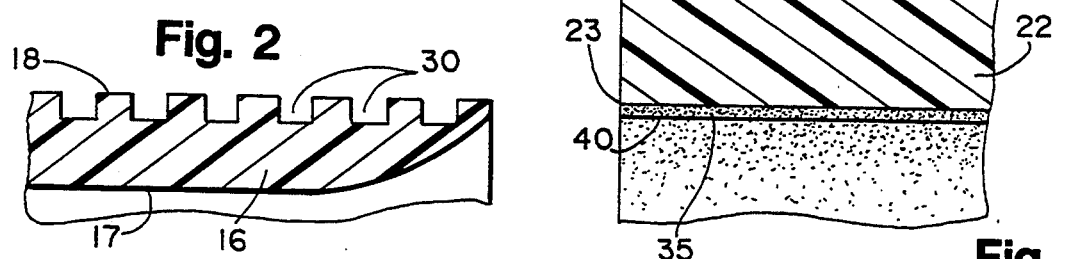
Fig. 2
Fig. 3
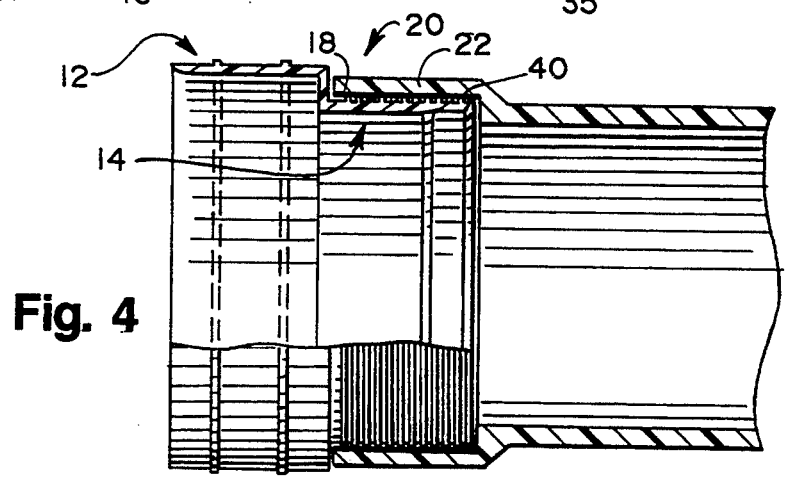
Fig. 4
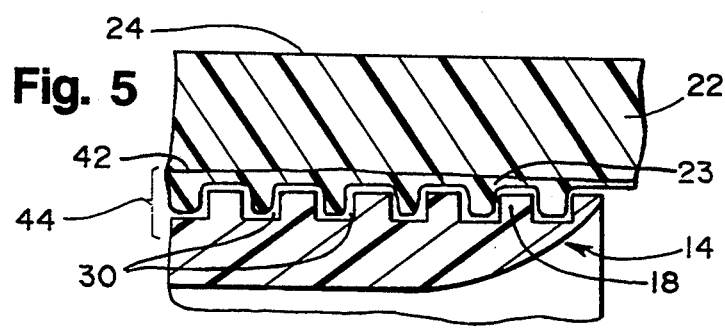
Fig. 5

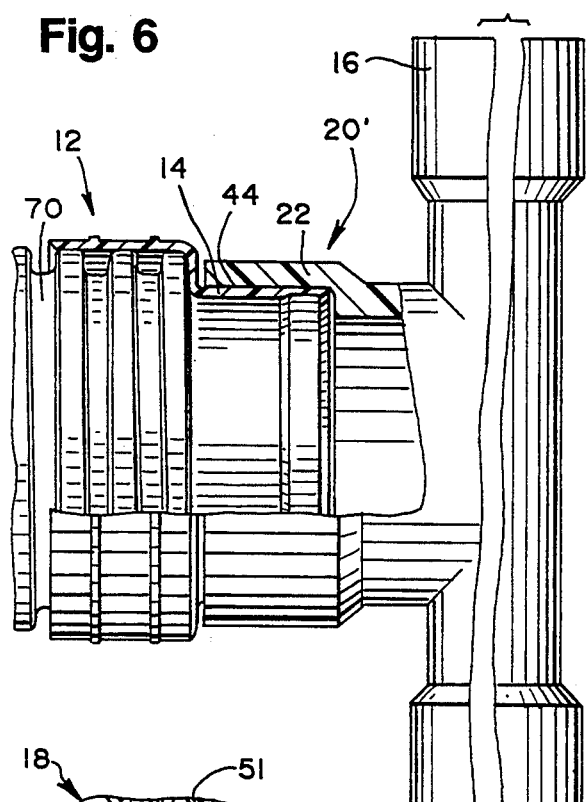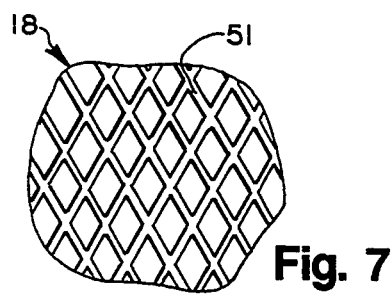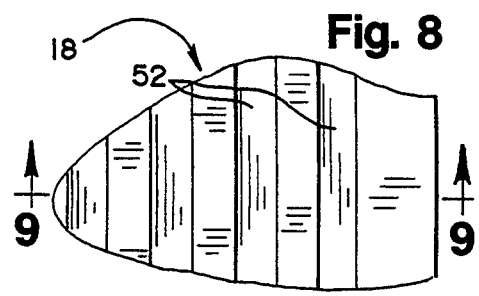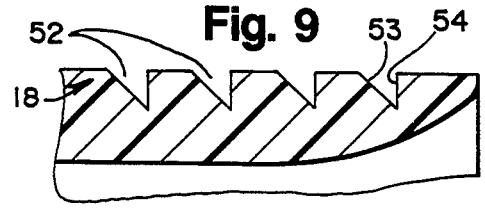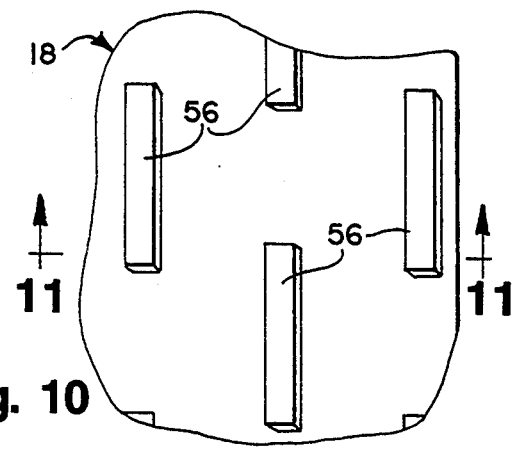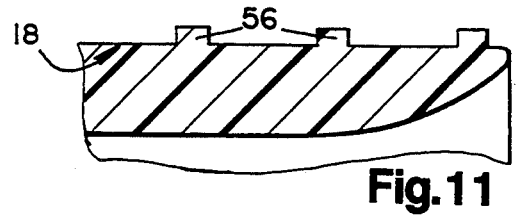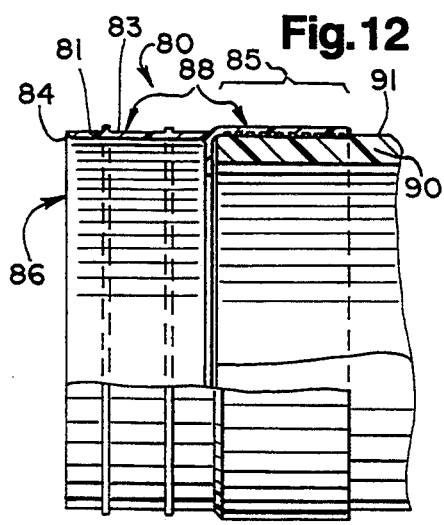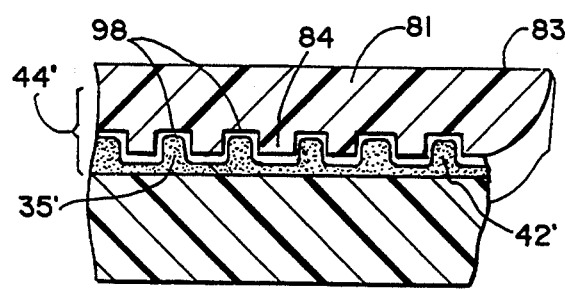

METHOD FOR CONNECTING A PIPE CONNECTOR TO A HARD PLASTIC PIPE

FIELD OF THE INVENTION

This invention relates to a flexible pipe connector made of an inert polymer which can be connected to a hard plastic pipe by virtue of a series of undercuts formed on the flexible pipe connector to receive liquified hard plastic when a solvent weld glue is applied to the hard plastic pipe.

BACKGROUND OF THE INVENTION

In the construction industry, PVC pipe and corrugated plastic pipe are widely used for construction of drain tiles, installation of septic systems and many other commercial and residential purposes. Corrugated plastic pipe is known as being inexpensive and a reliable material while PVC pipe is a standard in the industry although not quite as economical. Although corrugated plastic pipe is relatively inexpensive, couplings to connect lengths of corrugated pipe are relatively expensive and can create an expense far in excess of the cost of the corrugated pipe itself. In co-owned U.S. patent application Ser. No. 913,143, filed Jul. 14, 1992, entitled "Flexible Pipe Connector", the present inventor discloses a female-to-female flexible pipe connector for connecting lengths of corrugated pipe. The flexible pipe connector is made of an inert polymer, such as linear low density polyethylene, which is flexible and stretchable in nature so that a length of corrugated pipe received in a female end stretches the female end so as to produce radially inward compressive forces on a corrugated pipe or smooth-walled pipe, effectuating a gravity flow watertight seal between the connector and the pipe. The referenced application also discloses a male-to-female flexible pipe connector wherein the female end receives the corrugated pipe in the same manner but the male end is adapted to be inserted into a flexible seal member of a septic drop box.

As methods of connecting corrugated pipe to pipe components made of PVC are relatively unknown in the art, it would be desirable to be able to connect the male end of the flexible pipe connector to a pipe component comprised of PVC. However, polyethylene, and more generally, inert polymers, are chemically inert and are not practical for using with the typical solvent weld glues which are used to connect PVC pipe to PVC components. Therefore, the problem to be solved by the present invention is to construct a flexible pipe connector which may be used to sealably connect PVC components and a method for accomplishing this end.

SUMMARY OF THE INVENTION

The present invention addresses the above problems by providing a flexible pipe connector which comprises a tubing member made of polyethylene, preferably linear low density polyethylene, and having a cylindrical wall with inner and outer surfaces, said cylindrical wall defining a male end which has a plurality of receiving means formed on the outer surface thereof. The receiving means is adapted to receive liquified hard plastic from a hard plastic pipe within which the male end is to be inserted when a suitable melting agent, e.g., solvent weld glue, is applied between the outer surface of a male end and an inner surface of a female end of the hard plastic pipe. In this manner, the solvent weld glue liquifies an inner layer of the female end to form a liquified layer of plastic which flows into the receiving means of the connector male end and then hardens. This acts to sealably secure the male end of a polyethylene flexible pipe connector into the female end of the hard plastic pipe or pipe fitting.

Thus, it is a primary object of the present invention to provide a flexible pipe connector made of an inert polymer which can be connected at one end to a length of corrugated pipe or smooth-walled pipe and at another end to a hard plastic pipe or pipe fitting, such as made of PVC.

It is another object of the present invention to provide a method for connecting a polyethylene pipe connector to a pipe or pipe component made of hard plastic.

It is another object of the present invention to provide a flexible pipe connector which has a female end for sealably receiving a length of hard plastic pipe.

The means by which the foregoing and other objects of the present invention are accomplished and the manner of their accomplishment will be readily understood from the following specification upon reference to the accompanying drawyings, in which:

FIG. 1 is an exploded side view, shown in partial cross section, of a flexible pipe connector with a male end and a hard plastic pipe with a female end;

FIG. 2 is an enlarged cross section of the cylindrical wall of the male end of a flexible pipe connector;

FIG. 3 is an enlarged cross section of the pipe wall of the female end of the hard plastic pipe shown after a melting agent has been applied to its inner surface;

FIG. 4 is an enlarged side view shown in partial cross section of the flexible pipe connector with the male end inserted into the female end of a hard plastic pipe;

FIG. 5 is an enlarged cross sectional view of the cylindrical wall of the flexible pipe connector and the pipe wall of the hard plastic pipe;

FIG. 6 is a partially cutaway side view shown in partial of the flexible pipe connector with a length of corrugated pipe inserted into the female end and the male end inserted into the female end of a hard plastic pipe component;

FIG. 7 shows a portion of the outer surface of a male end having one pattern of undercut receiving means;

FIG. 8 shows a portion of the outer surface of the male end with another pattern of undercut receiving means;

FIG. 9 is an enlarged cross sectional view of the male end of FIG. 8, taken along line 9—9, and showing the undercuts;

FIG. 10 shows a portion of the outer surface of the male end having a plurality of raised protrusions extending therefrom;

FIG. 11 is an enlarged cross sectional view of the male end of FIG. 10, taken along line 11—11, and illustrating the protrusions;

FIG. 12 shows a female-to-female flexible pipe connector having a length of hard plastic pipe inserted into a female end thereof; and FIG. 13 is an enlarged cross sectional view of the interface between the cylindrical wall of the flexible pipe connector and the pipe wall of FIG. 12.

DESCRIPTION OF THE PREFERRED EMBODIMENT

Having reference to the drawings, wherein like reference numerals indicate corresponding elements, there is shown in FIG. 1 an illustration of the flexible pipe connector 10 of a preferred embodiment and a female end 20 of a hard plastic pipe component. The flexible pipe connector 10 has a female end 12 and a male end 14. Both the male end 14 and the female end 12 are defined by a cylindrical wall 16, having an inner surface 17 and an outer surface 18. An annular wall 13, which is perpendicular to a longitudinal axis of the cylindrical wall 16, is connected at one end 15 to the cylindrical wall 16 of the female end 12, and connected at an another opposite end to the cylindrical wall 16 of the male end 14.

The entire flexible pipe connector 10 is preferably made of linear low density polyethylene, however, it can be made of polyethylene or any other inert polymer having the necessary properties of toughness, flexibility and stretchability needed for the female end 12 to engage a length of corrugated pipe. When a length of corrugated pipe is inserted into the female end 12, the cylindrical wall 16 stretches radially outward so as to exert radially inward compressive forces against the corrugated pipe forming a gravity flow fluid-tight seal. Additionally, if desired to increase the sealing effect, a clamping means, such as a radiator clamp, (not shown) can be placed about an outer periphery of the female end 12 so as to effectuate a pressure flow water-tight seal about the length of corrugated pipe or smooth-walled pipe inserted into the connector's female end 12. (For a more detailed description of the operation of the female end of the flexible pipe connector 10, reference may be had to co-owned U.S. patent application Ser. No. 913,143, filed Jul. 14, 1992 entitled "Flexible Pipe Connector".)

The female end 20 of the hard plastic pipe component (not shown) has a pipe wall 22 with an exterior surface 24 and an interior surface 23. Hard plastic pipe components with such a female end 20 are well known and are sold in many standard sizes and shapes, such as a "T" or "Y" connective component. Typically, the pipe wall 22 is 0.20 inches thick and is made of a hard plastic material, such as polyvinylchloride typically known in the industry as PVC pipe, or of so-called ABS plastic, or of styrene plastic. Although the invention is shown as working well with PVC pipe, the flexible pipe connector of the present invention can be used with any hard plastic pipe or pipe component which can be chemically attached. It will be understood that the corresponding pipe wall thickness for a hard plastic pipe is commonly somewhat thicker, i.e., 0.25 inches, such found in so-called Schedule 40 PVC pipe.

As shown in FIG. 2, the cylindrical wall 16 of the male end 14 has a plurality of concentric grooves 30 on the outer surface 18. These concentric grooves 30 act as a receiving means for receiving a liquified layer 40 of hard plastic pipe component when a solvent weld glue is applied to a surface of the hard plastic pipe component so as to soften and liquifies the same. When used with the present invention, the mating surface of the hard plastic pipe has three states: an original solid state; a liquified state when a solvent weld glue is applied to the hard plastic; and a solid state once the hard plastic in the liquified state cures.

The cylindrical wall 16 of the male end 14, when it is to be used with a typical 4" PVC pipe component, is preferably about 0.70" thick. The concentric grooves 30 preferably have a depth of about 0.010" for receiving the liquified hard layer 40 of hard plastic. Although in this embodiment the specific dimensions of the cylindrical wall 16 are given, these dimensions are not absolute and will be varied depending upon the size of the hard plastic pipe or pipe component that the flexible pipe connector 10 is to be attached to. One having skill in the art can ascertain the relative specific dimensions of the cylindrical wall 16 in relation to the dimensions of the hard plastic pipe or component.

FIG. 3 illustrates the pipe wall 22 of the female end 20 of the hard plastic pipe component after a melting agent 35 has been applied to the interior surface 23 of the female end 20 so as to form a liquified, i.e., melted, layer 40. The melting agent 35 can be any solvent weld glue known in the art and commonly used, such as plumber's solvent weld glue, for example. Typically, the melting agent 35 will attack, i.e., soften, the first 0.005" to 0.010" of the interior surface 23 to which it is applied. Although curing times will vary, the melting agent 35 should be selected so that the interior surface 23 will form a liquified layer 40 for a sufficient period of time for the male end 14 to be inserted into the female end 20. Thereafter, the liquified layer 40 will resolidify in a relatively short period of time in order to form a reconfigured solid layer 42 as shown in FIG. 5, i.e, it will now be shaped to correspond to whatever configuration of undercut or protruding receiving means are formed on the mating connector surface.

The male end 14 of the flexible pipe connector 10 is shown inserted into the female end 20 in FIG. 4. FIG. 5 is an enlarged cross sectional view of the interface 44 of the connector male end 14 and hard plastic pipe female end 20, the latter sometimes being called a "bell" end. As shown in FIG. 5, once the connector male end 14 is inserted into the pipe female end 20, the liquified layer 40 resolidifies into the solid layer 42 but only after molten pipe material has flowed into the concentric grooves 30 of the male end 14. This resolidified layer 42 engages the plurality of concentric grooves 30 so as to prevent the male and female ends 14 and 20 from moving relative to one another along their common longitudinal axis, i.e., from being pulled apart. The interface 44 of the solid layer 42 and the concentric grooves 30 also prevents fluids from entering the interface 44, a water-tight seal is created therebetween. In this manner, the receiving means of the male end 14 are now lockably engaged with the solid layer 42 of the pipe's female end 20 so that the flexible pipe connector 10 and the pipe 20 are sealably secured together.

A typical use of the present invention, shown in its entirety, is illustrated in FIG. 6 where the male end 14 of the flexible pipe connector 10 is inserted into the female end 20' of a hard plastic pipe component 60, the latter here in the shape of a "T" member with bell ends. Although this embodiment shows the hard plastic pipe component as a "T" connector, the flexible pipe connector 10 can be used with any hard plastic pipe or pipe component having a female end, such as a 45°, elbow, or "Y" member, for example. A length of corrugated pipe 70 is inserted into the female end 12 of the flexible pipe connector 10 forming a gravity flow fluid-tight seal between the corrugated pipe 70 and the flexible pipe connector 10, all as further described in co-owned U.S. patent application Ser. No. 913,143, filed Jul. 14, 1992 entitled "Flexible Pipe Connector". Since the male end 14 of flexible pipe connector 10 has receiving means formed on the outer surface 18 thereof, the use of a melting agent 35 between the T-component female end 20" and the male end 14 creates an interlocking interface 44 between such parts which acts to prevent their separation and provides a sealably secure interconnection.

FIG. 7 illustrates an alternative embodiment of the receiving means disposed on the male end's outer surface 18 in the form of a plurality of diagonal grooves 51, receptive sets of which are oppositely angularly orientated to each other.

Another alternative embodiment of the receiving means is illustrated in FIG. 8 which shows a pattern of undercuts 52 disposed on the outer surface 18 of the male end 14. These undercuts 52 are further illustrated in FIG. 9 which shows an enlarged cross sectional view taken at line 9—9. The undercuts 52 are formed so as to have a slanted cut 53 and a vertical wall 54. When the connector male end 14, as formed with such undercuts 52, is inserted into the pipe component female end 20', the liquified layer 40 flows into the undercuts 52 until it forms a solid layer 42 (see FIG. 5). Once such a reconfigured solid layer 42 is formed, the solid layer 42 acts against the vertical wall segments 54 (of the undercuts 52) so as to prevent longitudinal movement of the male end 14 inside of the female end 20'. It should be noted that these undercuts can be placed in a pattern such as shown in FIG. 8 or may be randomly disposed about the outer surface 18 of the male end 14 of the flexible pipe connector 10. The undercuts 52 may also be disposed in a diagonal pattern such as diagonal grooves 51 (FIG. 7) or any other pattern or shape to create the required receiving means on the flexible connector. That is, any of these patterns of undercuts 52 forms an undercut means for receiving the liquified layer of hard plastic.

FIG. 10 illustrates another alternative embodiment of the present invention in the form of a plurality of spaced protrusions 56 extending radially outward from the outer surface 18). These protrusions 56 are further illustrated in an enlarged cross sectional enlarged view in FIG. 11. When the male end 14 is inserted into the female end 20, these protrusions 56 extend into the liquified layer 40. When the liquified layer 40 resolidifies into solid layer 42, the protrusions 56 will be embedded in the solid layer 42 so as to prevent longitudinal movement of either the connector male end or the pipe female end thereby sealably securing such parts together.

The undercuts 51, 52 or the raised protrusions 56 are preferably molded onto the male end 14 during manufacture of the flexible connector 10, such as part of an injecting molding process. However, they may be formed by various other processes, such as cut onto the outer surface 18 of the male end 14, such as by using a lathe, file, or other cutting device, for example.

In the above embodiments, the invention has been shown with receiving means disposed upon the outer surface 18 of the male end 14. However, the invention is equally useful when the receiving means are placed upon the interior of a connector female end 80 (see FIG. 12). There, a female-to-female flexible pipe connector 80 is shown for interconnecting lengths of hard plastic pipe 90. The female-to-female connector 80 has two female ends 88, each female end 88 having a receiving length 85 and being defined by a cylindrical wall 81 with inner and outer surfaces 84 and 83. The hard plastic pipe 90 is inserted into a mouth 86 of the female end 88 so that the tube wall 81 stretches radially outward causing radially inward compressive forces against an outer wall 91 of the hard plastic pipe 90. (That female-to-female flexible pipe connector 80 is essentially the same form of flexible pipe connector as disclosed in co-owned U.S. patent application Ser. No. 913,143, filed Jul. 14, 1992 entitled "Flexible Pipe Connector". However, the receiving means of the present invention can be advantageously used in conjunction with a female-to-female connector so as to allow the connector to be used in sealably connecting lengths of straight hard plastic pipe, e.g., PVC pipe, including odd lengths thereof not including any enlarged or "bell" ends.

FIG. 13 illustrates this use of the invention and shows a length of hard plastic pipe 90 inserted into the connector female end 88. In this enlarged cross sectional view, the outer surface 91 is exposed to a melting agent 35 so as to form a liquified layer 40 in the same manner as earlier described. The liquified layer 40 hardens into a reconfigured solid layer 42 at the interface 44' between the inner surface 84 of the connector female end 88 and the outer surface 91 of the hard plastic pipe 90. Again, the inner surface 84 of the female end 88 has formed thereon a receiving means, shown in FIG. 13 as a plurality of concentric grooves 98, for engaging the resolidified layer 42 at the interface 44. In this manner, solid layer 42 engages the concentric grooves 98 so as to sealably secure the hard plastic pipe 90 within and to the connector female end 88. Although the female-to-female connector 80 is shown with its receiving means in the form of a plurality of concentric grooves 98, the receiving means may also be comprised of any of the embodiments earlier discussed, or any other variations thereof which would occur to those skilled in the art.

From the foregoing, it is believed that those skilled in the art will readily appreciate the unique features and advantages of the present invention over previous types of innerconnections between corrugated pipe, hard plastic pipe, and hard plastic fittings therefor. Further, it is to be understood that while the present invention has been described in relation to a particular preferred and alternate embodiments as set forth in the accompanying drawings and as above described, the same nevertheless are susceptible to change, variations and substitution of equivalents without departure from the spirit and scope of this invention. It is therefore intended that the present invention be unrestricted by the foregoing description and drawings, except as may appear in the following appended claims.

We claim:

1. A method of sealably interconnecting a flexible pipe connector to a hard, plastic pipe component, said method comprising the steps of:

forming said flexible pipe connector as a tubular element of polyethylene defined by a flexible and stretchable cylindrical wall having an inner surface and an outer surface, at least one of said inner and outer surfaces being formed with a plurality of receiving means for receiving a liquefied layer of said hard plastic pipe component;

applying a solvent weld glue onto a mating surface of said hard plastic pipe component so as to form said liquefied layer, said liquefied layer being adapted to harden into a reconfigured solid layer; and engaging said at least one inner and outer surface of said cylindrical wall of said flexible pipe connector with said mating surface of said hard plastic pipe component, so that said liquefied layer flows into said receiving means and hardening said liquefied layer into said reconfigured layer so that said reconfigured solid layer engages said receiving means to create a sealed interlocking interconnection between said flexible pipe connector and said hard plastic pipe component, said sealed interconnection operable to substantially prevent water drainage therethrough.

2. The method of claim 1 wherein said hard plastic pipe component is made of polyvinyl chloride.

3. The method of claim 1 wherein said receiving means comprises a plurality of undercuts disposed on said at least one of said inner and outer surfaces of said flexible pipe connector and each of said undercuts having a slanted wall, and a vertical wall perpendicular to a longitudinal axis of said flexible pipe connector, each of said slanted and vertical walls being adapted to receive a portion of said liquefied layer so that when said liquefied layer hardens into said reconfigured solid layer relative longitudinal movement of said flexible pipe connector and hard plastic component is prevented.

4. The method of claim 1 wherein said receiving means on said at least one of said inner and outer surfaces of said flexible pipe connector comprises a plurality of concentric groove formed substantially perpendicular to the longitudinal axis of said flexible pipe connector.

5. The method of claim 1 wherein said receiving means on said at least one of said inner and outer surfaces of said flexible pipe connector comprises a first plurality of grooves aligned diagonally to the longitudinal axis of said flexible pipe connector and a second plurality of grooves aligned at an angle relative to said first plurality of grooves.

6. The method of claim 5, wherein said angle is approximately 90°.

7. A method of sealably interconnecting a corrugated pipe end to a hard plastic pipe with a flexible pipe connector, said method comprising the steps of:

forming said flexible pipe connector of polyethylene as a tubular member having a female end and a male end, said female end having a flexible cylindrical wall with a receiving length adapted to stretch radially outward along a length of said corrugated pipe, and said male end having an outer surface with a plurality of receiving means for receiving a liquefied layer of said plastic pipe;

inserting said corrugated pipe end into said female end of said tubular member such that said receiving length of said female end exerts radially inward compressive forces on said corrugated pipe end and forms a fluid-tight seal;

applying a solvent weld glue onto a mating surface of said hard plastic pipe to form said liquefied layer, said liquefied layer being adapted to harden into a reconfigured solid layer; and inserting said male end and said flexible pipe connector into said hard plastic pipe so that said liquefied layer flows into said receiving means and hardening said liquefied layer into said reconfigured solid layers so that said reconfigured solid layer engages said receiving means to create a water-tight seal between said flexible pipe connector and said hard plastic pipe.

* * * * *

UNITED STATES PATENT AND TRADEMARK OFFICE
CERTIFICATE OF CORRECTION

PATENT NO. : 5,336,351

DATED : August 9, 1994

INVENTOR(S) : Theodore W. Meyers

It is certified that error appears in the above-indentified patent and that said Letters Patent is hereby corrected as shown below:

In Claim 4, column 7, line 22 "groove" should be ---grooves---

In Claim 7, column 8, line 27 "layers" should be ---layer---

Signed and Sealed this

Eighteenth Day of October, 1994

Attest:

BRUCE LEHMAN

Attesting Officer

Commissioner of Patents and Trademarks